(12) United States Patent
McGinnis (10) Patent No.: US 8,815,091 B2
(45) Date of Patent: Aug. 26, 2014

(54) SPIRAL WOUND MEMBRANE MODULE FOR FORWARD OSMOTIC USE (75) Inventor: Robert L. McGinnis, Cambridge, MA (US)

(73) Assignee: Yale University, New Haven, CT (US)

(*) Notice: Subject to any disclaimer, the term of this patent is extended or adjusted under 35 U.S.C. 154(b) by 276 days.

(21) Appl. No.: 12/933,219

(22) PCT Filed: Mar. 20, 2009

(86) PCT No.: PCT/US2009/037817
§ 371 (c)(1),
(2), (4) Date: Nov. 2, 2010

(87) PCT Pub. No.: WO2009/151709
PCT Pub. Date: Dec. 17, 2009

(65) Prior Publication Data
US 2011/0036774 A1 Feb. 17, 2011

Related U.S. Application Data (60) Provisional application No. 61/070,087, filed on Mar. 20, 2008.

(51) Int. Cl.
*B01D 63/10* (2006.01)
*B01D 63/12* (2006.01)
*B01D 61/00* (2006.01)
*B01D 65/00* (2006.01)
*F03G 7/04* (2006.01)
*C02F 1/44* (2006.01)
*C02F 9/00* (2006.01)

(52) U.S. Cl.
CPC .............. *B01D 63/10* (2013.01); *B01D 63/103* (2013.01); *B01D 63/12* (2013.01); *B01D 61/002* (2013.01); *B01D 65/003* (2013.01); *B01D 2313/04* (2013.01); *B01D 2313/10* (2013.01); *B01D 2313/14* (2013.01); *F03G 7/04* (2013.01); *Y02E 10/36* (2013.01); *C02F 1/445* (2013.01); *C02F 9/00* (2013.01)
USPC .................. 210/321.76; 210/321.74; 210/649

(58) Field of Classification Search
None
See application file for complete search history.

(56) References Cited

U.S. PATENT DOCUMENTS 4,033,878 A  7/1977 Foreman et al.
4,761,229 A  8/1988 Thompson et al.
(Continued)

FOREIGN PATENT DOCUMENTS

WO  WO 00/78436 A1  12/2000
WO  WO 2005/089913 A1  9/2005

OTHER PUBLICATIONS

International Search Report for PCT/US2009/037817 dated Jan. 4, 2010.
(Continued)

Primary Examiner — Krishnan S Menon
(74) Attorney, Agent, or Firm — McCarter & English, LLP; Danielle L. Herritt (57) ABSTRACT A spiral wound membrane module for forward osmotic use is disclosed. The membrane module may generally include a forward osmosis membrane in a spiral wound configuration. The module may include two inlets and two outlets, and may define first and second fluid flow paths. The inlets to each of the fluid flow paths may be generally isolated so as to prevent mixing. In some embodiments, the membrane module may include a distributer region and a collector region.

20 Claims, 4 Drawing Sheets (56) References Cited

U.S. PATENT DOCUMENTS

| | | | |
|---|---|---|---|
| 4,834,881 A | 5/1989 | Sawada et al. | |
| 4,855,058 A | 8/1989 | Holland et al. | |
| 4,861,487 A | 8/1989 | Fulk et al. | |
| 4,902,417 A | 2/1990 | Lien | |
| 4,944,877 A | 7/1990 | Maples | |
| 5,034,126 A | 7/1991 | Reddy et al. | |
| 5,096,584 A * | 3/1992 | Reddy et al. | 210/321.74 |
| 5,580,452 A * | 12/1996 | Lin | 210/321.74 |
| 6,673,242 B1 | 1/2004 | Herron | |
| 6,849,184 B1 | 2/2005 | Lampi et al. | |
| 7,591,933 B2 | 9/2009 | Grebenyuk et al. | |
| 2002/0168491 A1 | 11/2002 | Runkle et al. | |
| 2005/0006301 A1 | 1/2005 | Angelini et al. | |
| 2005/0077243 A1 | 4/2005 | Pinnau et al. | |
| 2005/0145568 A1 | 7/2005 | McGinnis | |
| 2006/0043013 A1 | 3/2006 | Hiro et al. | |
| 2006/0226067 A1 | 10/2006 | Herron et al. | |
| 2007/0251883 A1 | 11/2007 | Niu et al. | |

OTHER PUBLICATIONS

Written Opinion for PCT/US2009/037817 dated Jan. 4, 2010.
Loeb S. One hundred and thirty benign and renewable megawatts from Great Salt Lake? The possibilities of hydroelectric power by pressure-retarded osmosis. *Desalination* 141(1):85-91 (2001).
Supplementary European Search Report dated Sep. 24, 2012, from corresponding European patent application No. EP 09763003.

* cited by examiner

SPIRAL WOUND MEMBRANE MODULE FOR FORWARD OSMOTIC USE

RELATED APPLICATIONS

This application is the U.S. National Stage of International Patent Application No. PCT/US2009/037817, filed Mar. 20, 2009, which claims the benefit of priority to U.S. Provisional Patent Application Ser. No. 61/070,087, filed Mar. 20, 2008, each of which is hereby incorporated by reference in its entirety.

FIELD OF THE TECHNOLOGY

One or more aspects relates generally to osmotic separation. More particularly, one or more aspects relate to membrane modules for use in engineered osmosis, such as pressure retarded osmosis or any osmotic separation of solutes and water from an aqueous solution by, for example, forward osmosis, such as seawater desalination, brackish water desalination, wastewater purification and contaminated water remediation.

BACKGROUND

Forward osmosis has been used for desalination. In general, a forward osmosis desalination process involves a container having two chambers separated by a semi-permeable membrane. One chamber contains seawater. The other chamber contains a concentrated solution that generates a concentration gradient between the seawater and the concentrated solution. This gradient draws water from the seawater across the membrane, which selectively permits water to pass but not salts, into the concentrated solution. Gradually, the water entering the concentrated solution dilutes the solution. The solutes are then removed from the dilute solution to generate potable water.

SUMMARY

Aspects relate generally to systems and methods for osmotic separation.

In accordance with one or more embodiments, a spiral wound forward osmosis membrane module may comprise a spirally wound forward osmosis membrane defining a membrane pocket having an interior region and an exterior region, the spirally wound forward osmosis membrane having first and second ends. The module may further comprise a distributer region at the first end comprising a first inlet in fluid communication with the interior region of the membrane pocket and a second inlet in fluid communication with the exterior region of the membrane pocket. The module may still further comprise a collector region at the second end comprising a first outlet in fluid communication with the interior region of the membrane pocket and a second outlet in fluid communication with the exterior region of the membrane pocket.

In some embodiments, the first inlet may be fluidly isolated from the second inlet. The first outlet may be fluidly isolated from the second outlet. The distributor region may comprise an end cap which may be constructed and arranged to fluidly isolate the first and second inlets. In one embodiment, the end cap may comprise at least one tube having a lumen fluidly connected to the interior region of the membrane pocket and an exterior region in fluid communication with the exterior region of the membrane pocket. The first inlet may be fluidly connected to the lumen of the at least one tube. The second inlet may be in fluid communication with the exterior region of the at least one tube.

In some embodiments, at least a portion of one of the first and second ends of the spirally wound forward osmosis membrane may be potted. In other embodiments, at least a portion of one of the first and second ends of the spirally wound forward osmosis membrane may be mounted in a plate. The module may further comprise at least one spacer positioned along a fluid flow path defined by the interior region of the membrane pocket from the first inlet to the first outlet. The module may also comprise at least one spacer positioned along a fluid flow path defined by the exterior region of the membrane pocket from the second inlet to the second outlet. In some embodiments, a thickness of the at least one spacer may vary along a longitudinal axis of the membrane module. At least one embodiment the module may include a center support in mechanical cooperation with the spirally wound forward osmosis membrane. In some embodiments, the spirally wound forward osmosis membrane is asymmetric. The exterior region of the membrane pocket may be defined by a rejecting layer of the spirally wound forward osmosis membrane. In some embodiments, the module may be integrated in a pressure retarded osmosis system.

In accordance with one or more embodiments, a water treatment system may comprise a spiral wound forward osmosis membrane module comprising a spirally wound forward osmosis membrane constructed and arranged to define isolated and substantially parallel first and second fluid flow paths along a longitudinal axis of the module, a first inlet and a first outlet fluidly connected to the first fluid flow path, and a second inlet and a second outlet fluidly connected to the second fluid flow path. The water treatment system may further comprise a source of a first solution fluidly connected to the first inlet, and a source of a second solution fluidly connected to the second inlet.

In some embodiments, the first and second inlets may be positioned at a first end of the spirally wound forward osmosis membrane. The source of the first solution may be a source of a saline solution. In some embodiments, the saline solution comprises seawater. The source of the second solution may comprise a source of a draw solution. In at least one embodiment, the draw solution may comprise ammonia and carbon dioxide in a molar ratio of greater than about 1 to 1.

In some embodiments, the water treatment system may further comprise a second forward osmosis spiral wound membrane module. The system may also include a control system configured to control at least one of a flow rate of the first solution at the first inlet and a flow rate of the second solution at the second inlet. In at least one embodiment, the system may include a separation system fluidly connected to one of the first and second outlets. In some embodiments, an outlet of the separation system may be fluidly connected to one of the first and second inlets. In at least one embodiment, the system is a pressure retarded osmosis system further comprising a turbine fluidly connected downstream of one of the first and second outlets.

In accordance with one or more embodiments, a method of facilitating a desalination process may comprise providing a spiral wound forward osmosis membrane module comprising a spirally wound forward osmosis membrane defining a membrane pocket having an interior region and an exterior region, the spirally wound forward osmosis membrane having first and second ends, a distributer region at the first end comprising a first inlet in fluid communication with the interior region of the membrane pocket and a second inlet in fluid communication with the exterior region of the membrane pocket, and a collector region at the second end comprising a first outlet in fluid communication with the interior region of the membrane pocket and a second outlet in fluid communication with the exterior region of the membrane pocket. The method of facilitation may further include fluidly connecting a source of a draw solution to the first inlet and fluidly connecting a source of a brine solution to the second inlet.

In some embodiments, fluidly connecting a source of a draw solution to the first inlet may comprise fluidly connecting a source of a draw solution comprising ammonia and carbon dioxide in a molar ratio of greater than about 1 to 1. The method may further comprise fluidly connecting the first outlet to a distillation column. In at least one embodiment, the method may further comprise fluidly connecting an outlet of the distillation column to the first inlet. The spiral wound forward osmosis membrane or the provided module may be constructed and arranged to define isolated and substantially parallel first and second fluid flow paths along a longitudinal axis of the module. In at least one embodiment, the method is a pressure retarded osmosis process further comprising fluidly connecting the collector region of the membrane module to a turbine.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE FIGURES

Various aspects of at least one embodiment are presented in the accompanying figures. The figures are provided for the purposes of illustration and explanation and are not intended as a definition of the limits of the invention. In the figures.

DETAILED DESCRIPTION

In accordance with one or more embodiments, an osmotic method for extracting water from an aqueous solution may generally involve exposing the aqueous solution to a first surface of a forward osmosis membrane. A second solution, or draw solution, with an increased concentration relative to that of the aqueous solution may be exposed to a second opposed surface of the forward osmosis membrane. Water may then be drawn from the aqueous solution through the forward osmosis membrane and into the second solution generating a water-enriched solution via forward osmosis which utilizes fluid transfer properties involving movement from a less concentrated solution to a more concentrated solution. The water-enriched solution, also referred to as a dilute draw solution, may be collected at a first outlet and undergo a further separation process to produce purified water. A second product stream, i.e. a depleted or concentrated aqueous process solution, may be collected at a second outlet for discharge or further treatment.

Hydraulic pressure may generally promote transport of the first and second solutions through a membrane module along a longitudinal axis of their respective channels, while osmotic pressure may generally promote transport of water across a forward osmosis membrane in the module from the feed to the draw solution. Alternately, hydraulic pressure may be exerted on the feed solution to assist the flow of water from the feed to draw solutions, or hydraulic pressure may be placed on the draw solution to allow the production of power from the expansion of the volume of the draw solution due to membrane flux of water from the feed solution driven by the osmotic pressure difference between the two solutions (PRO). Generally, flow channels within the module are designed to minimize the hydraulic pressure necessary to cause flow through these channels (crossflow), but this is often at odds with the desire to create turbulence in the flow channels, beneficial for efficient generation of osmotic pressure difference between the two solutions, which has a tendency to increase resistance to flow. Higher osmotic pressure differences may generally increase transmembrane flux, but may also have a tendency to increase the amount of heat required to separate the draw solutes from the dilute draw solution for production of a dilute water product and a reconcentrated draw solution.

In accordance with one or more embodiments, a forward osmosis membrane module may include one or more forward osmosis membranes. The forward osmosis membranes may generally be semi-permeable, for example, allowing the passage of water, but excluding dissolved solutes therein, such as sodium chloride, ammonium carbonate, ammonium bicarbonate, and ammonium carbamate. Many types of semi-permeable membranes are suitable for this purpose provided that they are capable of allowing the passage of water (i.e., the solvent) while blocking the passage of the solutes and not reacting with the solutes in the solution. The membrane can have a variety of configurations including thin films, hollow fiber membranes, spiral wound membranes, monofilaments and disk tubes. There are numerous well-known, commercially available semi-permeable membranes that are characterized by having pores small enough to allow water to pass while screening out solute molecules such as sodium chloride and their ionic molecular species such as chloride. Such semi-permeable membranes can be made of organic or inorganic materials. In some embodiments, membranes made of materials such as cellulose acetate, cellulose nitrate, polysulfone, polyvinylidene fluoride, polyamide and acrylonitrile co-polymers may be used. Other membranes may be mineral membranes or ceramic membranes made of materials such as $ZrO_2$ and $TiO_2$.

Preferably, the material selected for use as the semi-permeable membrane should generally be able to withstand various process conditions to which the membrane may be subjected. For example, it may be desirable that the membrane be able to withstand elevated temperatures, such as those associated with sterilization or other high temperature processes. In some embodiments, a forward osmosis membrane module may be operated at a temperature in the range of about 0 degrees Celsius to about 100 degrees Celsius. In some non-limiting embodiments, process temperatures may range from about 40 degrees Celsius to about 50 degrees Celsius. Likewise, it may be desirable for the membrane to be able to maintain integrity under various pH conditions. For example, one or more solutions in the membrane environment, such as the draw solution, may be more or less acidic or basic. In some non-limiting embodiments, a forward osmosis membrane module may be operated at a pH level of between about 2 and about 11. In certain non-limiting embodiments, the pH level may be about 7 to about 10. The membranes used need not be made out of one of these materials and they can be composites of various materials. In at least one embodiment, the membrane may be an asymmetric membrane, such as with an active layer on a first surface, and a supporting layer on a second surface. In some embodiments, an active layer may generally be a rejecting layer. For example, a rejecting layer may block passage of salts in some non-limiting embodiments. In some embodiments, a supporting layer, such as a backing layer, may generally be inactive.

In accordance with one or more embodiments, the at least one forward osmosis membrane of the membrane module may be spirally wound. A spiral wound configuration may be generally efficient in terms of facilitating forward osmosis within the module. The spiral wound configuration may be desirable in terms of containment of large amounts of surface area per unit of volume. The spiral wound configuration may also be desirable in terms of surface area contact along a fluid flow path with respect to residence time of a process stream within the forward osmosis membrane module. The membrane module may also be beneficially designed so as to reduce frictional resistance to fluid crossflow through the fluid flow channels, and to reduce dead spaces and poor mass transport, while encouraging turbulent flow. In at least one embodiment, both draw and feed solutions may travel along the longitudinal axis of the membrane module with minimal resistance or diversion of flow. A spirally wound forward osmosis membrane module may be of any desired dimensions.

In accordance with one or more embodiments, at least one forward osmosis membrane may be positioned within a housing or casing. The housing may generally be sized and shaped to accommodate the membranes positioned therein. For example, the housing may be substantially cylindrical if housing spirally wound forward osmosis membranes. The housing of the module may contain inlets to provide feed and draw solutions to the module as well as outlets for withdrawal of product streams from the module. In some embodiments, the housing may provide at least one reservoir or chamber for holding or storing a fluid to be introduced to or withdrawn from the module. In at least one embodiment, the housing may be insulated. In some non-limiting embodiments, a module assembly may be sealed inside a tubular housing such that seawater is passed into a space in-between epoxy blocks and the main sheet winding. Draw solution may pass through the interior of flat tubes leading the solution across a supporting layer side within the sheet winding.

In accordance with one or more embodiments, a forward osmosis membrane module may generally be constructed and arranged so as to bring a first solution and a second solution into contact with first and second sides of a semi-permeable membrane, respectively. Although the first and second solutions can remain stagnant, it is preferred that both the first and second solutions are introduced by cross flow, i.e., flows parallel to the surface of the semi-permeable membrane. This may generally increase membrane surface area contact along one or more fluid flow paths, thereby increasing the efficiency of the forward osmosis. In some embodiments, the first and second solutions may flow in the same direction. In other embodiments, the first and second solutions may flow in opposite directions. In at least some embodiments, similar fluid dynamics may exist on both sides of a membrane surface. This may be achieved by strategic integration of the one or more forward osmosis membranes in the module or housing.

In accordance with one or more embodiments, a forward osmosis membrane module may generally be constructed and arranged to provide a first fluid flow path and a second fluid flow path. The flow paths may generally run along a longitudinal axis of the module, such as from a first end to a second end. The first and second fluid flow paths may be separated by the forward osmosis membrane. A first solution may travel along the first fluid flow path and a second solution may travel along the second fluid flow path through the module. In the case of an asymmetric forward osmosis membrane, an active layer of the membrane may be associated with a first fluid flow path, and a supporting layer may be associated with a second fluid flow path. In at least one embodiment, aqueous water to be treated, such as seawater, may be in contact with the active layer of the forward osmosis membrane while the draw solution may be in contact with the supporting layer. In other embodiments, the opposite may apply. In some embodiments, the first and second fluid flow paths may be generally or substantially parallel to one another along a longitudinal axis of the membrane module. In at least one embodiment, the first and second fluid flow paths may be substantially isolated from one another so as to generally prevent mixing therebetween, though transmembrane osmotic passage of water from the first solution to the second solution within the module is desired to effect separation and purification of the solvent as described above.

In accordance with one or more embodiments, the first solution may be any aqueous solution or solvent containing one or more solutes for which separation, purification or other treatment is desired. In some embodiments, the first solution may be non-potable water such as seawater, salt water, brackish water, gray water, and some industrial water. A process stream to be treated may include salts and other ionic species such as chloride, sulfate, bromide, silicate, iodide, phosphate, sodium, magnesium, calcium, potassium, nitrate, arsenic, lithium, boron, strontium, molybdenum, manganese, aluminum, cadmium, chromium, cobalt, copper, iron, lead, nickel, selenium, silver and zinc. In some examples, the first solution may be brine, such as salt water or seawater, wastewater or other contaminated water. The first solution may be delivered to a forward osmosis membrane treatment system from an upstream unit operation such as industrial facility, or any other source such as the ocean. The second solution may be a draw solution containing a higher concentration of solute relative to the first solution. A wide variety of draw solutions may be used. For example, the draw solution may comprise a thermolytic salt solution. In some embodiments, an ammonia and carbon dioxide draw solution may be used, such as those disclosed in U.S. Patent Application Publication Number 2005/0145568 to McGinnis which is hereby incorporated herein by reference in its entirety for all purposes. In one embodiment, the second solution may be a concentrated solution of ammonia and carbon dioxide. In at least one embodiment, the draw solution may comprise ammonia and carbon dioxide in a molar ratio of greater than about 1 to 1.

The draw solution generally has a concentration greater than that of the feed solution. This may be achieved using solutes that are soluble enough to produce a solution that has a higher concentration than the feed solution. Preferably, the solute within the second solution should be easily removable from the second solution through a separation process, form at least one species that is more readily dissolved in the solvent of the second solution, i.e., the soluble species, and one species that is not readily dissolved within the solvent, i.e., the less-soluble species, and posses no health risk if trace amounts of the species of solute remain in the resulting solvent. The existence of the soluble and less-soluble species of solutes allows for the solutions to be adjusted or manipulated as needed. Typically, the soluble and less-soluble solute species reach a point in solution in which, under the particular condition temperature, pressure, pH, etc., neither species of solute is either increasing or decreasing with respect to the other, i.e., the ratio of the soluble to insoluble species of solute is static. This is referred to as equilibrium. Given the particular conditions of the solution, the species of solute need not be present in a one to one ratio at equilibrium. Through the addition of a chemical, referred to as a reagent, the balance between the species of solutes can be shifted. Using a first reagent, the equilibrium of the solution can be shifted to increase the amount of the soluble species of solute. Likewise, using a second reagent, the equilibrium of the solution may be shifted to increase the amount of the less-soluble solute species. After the addition of the reagents, the ratio of species of solutes may stabilize at a new level which is favored by the conditions of the solution. By manipulating the equilibrium in favor of the soluble species of solute, a second solution with a concentration near saturation can be achieved, a state in which the solutions solvent cannot dissolve anymore of the solute.

Preferred solutes for the second (draw) solution may be ammonia and carbon dioxide gases and their products, ammonium carbonate, ammonium bicarbonate, and ammonium carbamate. Ammonia and carbon dioxide, when dissolved in water at a ratio of about 1, form a solution comprised primarily of ammonium bicarbonate and to a lesser extent the related products ammonium carbonate and ammonium carbamate. The equilibrium in this solution favors the less-soluble species of solute, ammonium bicarbonate, over the soluble species of solute, ammonium carbamate and to a lesser extent ammonium carbonate. Buffering the solution comprised primarily of ammonium bicarbonate with an excess of ammonia gas so that the ratio of ammonia to carbon dioxide increases to about 1.75 to about 2.0 will shift the equilibrium of the solution towards the soluble species of the solute, ammonium carbamate. The ammonia gas is more soluble in water and is preferentially adsorbed by the solution. Because ammonium carbamate is more readily adsorbed by the solvent of the second solution, its concentration can be increased to the point where the solvent cannot adsorb anymore of the solute, i.e. saturation. In some non-limiting embodiments, the concentration of solutes within this second solution achieved by this manipulation is greater than about 2 molal, more than about 6 molal, or about 6 to about 12 molal.

Ammonia gas may be a preferred first reagent for ammonium carbamate since it is one of the chemical elements that results when the solute ammonium carbamate is decomposed, otherwise referred to as a constituent element. In general, it is preferred that the reagent for the solvent be a constituent element of the solute since any excess reagent can easily be removed from the solution when the solvent is removed, and, in a preferred embodiment the constituent element can be recycled as the first reagent. However, other reagents that can manipulate the equilibrium of the solute species in solution are contemplated so long as the reagent is easily removed from the solution and the reagent posses no health risk if trace elements of the reagent remain within the final solvent.

In accordance with one or more embodiments, a forward osmosis membrane module may generally include first and second inlets. The first and second inlets may be associated with sources of first and second solutions. In some embodiments, a source of a first solution may be a first solution reservoir and a source of a second solution may be a second solution reservoir. A first inlet may be fluidly connected to a source of an aqueous solution to be treated, and a second inlet may be fluidly connected to a source of a draw solution. The first and second inlets may also be associated with the first and second fluid flow paths, respectively, so as to facilitate delivery of first and second solutions to the membrane module for forward osmosis. In some embodiments, the first inlet may be in fluid communication with the first fluid flow path, and the second inlet may be in fluid communication with the second fluid flow path. The first and second inlets may be fluidly isolated from one another. In at least one embodiment, the first and second inlets are positioned at one end, i.e. a first or second end, of the forward osmosis membrane module. In other embodiments, the first and second inlets may be positioned at opposite ends of the forward osmosis membrane module.

In accordance with one or more embodiments, a forward osmosis membrane module may generally include first and second outlets. The first and second outlets may be associated with the first and second fluid flow paths, respectively, so as to facilitate removal of one or more product streams from the forward osmosis membrane module. A first outlet may collect a dilute draw solution and a second outlet may collect a depleted or concentrated aqueous process stream. In some embodiments, the first outlet may be in fluid communication with the first fluid flow path, and the second outlet may be in fluid communication with the second fluid flow path. The first and second outlets may be fluidly isolated from one another. In at least one embodiment, the first and second outlets are positioned at one end of the forward osmosis membrane module. In other embodiments, the first and second outlets may be positioned at opposite ends of the forward osmosis membrane module.

In some embodiments, first and second inlets may generally be positioned at a first end of the forward osmosis membrane module while first and second outlets may generally be positioned at a second end of the forward osmosis membrane module. In some such embodiments, a distributor region may generally provide the first and second inlets, and a collector region may generally provide the first and second outlets. The distributor region may be positioned at a first end of the membrane module and the collector region may be positioned at a second end of the membrane module.

In accordance with one or more embodiments, the forward osmosis membrane of the module may be constructed and arranged to define a membrane compartment. A membrane compartment may generally define at least a partially enclosed space. Thus, a membrane compartment may have an interior region and an exterior region. One or more sides of a membrane compartment may be sealed. In some embodiments, a membrane compartment may generally be referred to as a membrane pocket, having an interior region and an exterior region. A first fluid flow path may be associated with the interior region of the membrane pocket and a second fluid flow path may be associated with the exterior region of the membrane pocket. The membrane pocket may generally facilitate isolation of the first and second fluid flow paths to prevent mixing, apart from desired osmotic transmembrane transport for separation. In embodiments involving an asymmetric membrane, a first layer of the membrane may provide a surface of the interior region of the compartment while a second layer of the membrane may provide a surface of the exterior region of the compartment. In some embodiments, a rejecting layer may be associated with the exterior region of the membrane pocket and a supporting layer may be associated with the interior region of the membrane pocket.

In accordance with one or more embodiments, a forward osmosis membrane module may include a plurality of forward osmosis membranes. A module may include a plurality of spirally wound forward osmosis membranes. In embodiments wherein the membranes are constructed and arranged to provide or define a membrane compartment or pocket, the module may comprise a plurality of such compartments, each having an interior region and an exterior region. A membrane module may therefore comprise a plurality of first fluid pathways and a plurality of second fluid pathways. In some embodiments, the first fluid flow pathways may be associated with interior regions of membrane pockets, while second fluid flow pathways may be associated with exterior regions of membrane pockets, or spaces between adjacent membranes of the module. A first solution may flow along each of the first fluid pathways, and a second solution may flow along each of the second fluid pathways. Thus, a module may be scaled-up by increasing the number of forward osmosis membranes, such as spirally wound forward osmosis membranes, present in the module.

In accordance with one or more embodiments, a forward osmosis membrane module may include one or more features to facilitate introduction of first and second solutions to the membrane module while preventing mixing therebetween. Likewise, a forward osmosis membrane module may include one or more features to facilitate withdrawal or collection of first and second solutions from the membrane module while preventing mixing therebetween. In some embodiments, an end cap may be positioned at each end of a spiral wound membrane module. In at least one embodiment, end caps may be positioned at each end of a spirally wound membrane. In modules having a plurality of spirally wound membranes, each of the spirally wound membranes may have an end cap positioned at each end. The end cap may include at least one inlet and/or outlet in fluid communication with one or more fluid flow paths within the module. The end cap may be constructed and arranged so as to facilitate isolation of one or more fluid flow paths within the module. The end cap may be constructed and arranged so as to isolate one or more fluid inlets and/or fluid outlets.

In some embodiments, an end cap may comprise a first inlet in fluid communication with a first fluid flow path and a second inlet in fluid communication with a second fluid flow path. In one embodiment, an end cap may comprise a first inlet in fluid communication with an interior region of a membrane compartment. The end cap may comprise a second inlet in fluid communication with an exterior region of the membrane compartment.

In some embodiments, an end cap may comprise a first outlet in fluid communication with a first fluid flow path and a second outlet in fluid communication with a second fluid flow path. In one embodiment, an end cap may comprise a first outlet in fluid communication with an interior region of a membrane compartment. The end cap may also include a second outlet in fluid communication with an exterior region of the membrane compartment.

In other embodiments, a first end cap may include a first inlet in fluid communication with a first fluid flow path and a first outlet in fluid communication with a second fluid flow path. A second end cap may include a second inlet in fluid communication with the second fluid flow path and a second outlet in fluid communication with the first fluid flow path. The first end cap may be positioned at a first end of a spiral wound membrane and the second end cap may be positioned at a second end of the spiral wound membrane. The first fluid flow path may be along an interior region of a membrane pocket and the second fluid flow path may be along an exterior region of the membrane pocket.

In accordance with one or more embodiments, an end cap may comprise one or more ports in fluid communication with one or more fluid flow paths of the membrane module. The ports of the end cap may generally facilitate isolation of solutions introduced to or withdrawn from the spiral wound forward osmosis membrane module at the end cap. The ports may have any structure capable of generally preventing mixing of various solutions introduced and/or withdrawn at an end cap. A port may be constructed and arranged to isolate various solutions introduced and/or withdrawn at an end cap. A port may comprise a first region in fluid communication with a first fluid flow path and a second region in fluid communication with a second fluid flow path. The first and second regions may be arranged so as to prevent mixing between solutions introduced and/or withdrawn therefrom. The ports may generally be sized and spaced so as to facilitate fluid flow through the membrane module, such as to achieve a desired flux. This flux is generally achieved by encouraging turbulent flow in a relatively straight flow path from one end of the membrane module to the other, with minimum deviation of flow path and minimum resistance to flow arising from the special dimensions of the flow path.

In some embodiments, the ports may comprise tubes each having a lumen region and an exterior region. In at least one embodiment the tubes may be substantially flat tubes. Other embodiments envision oval or circular tube openings, and spaces between tubes taking rectangular, oval, triangular, or corrugated shapes, for example. One or more lumens may be fluidly connected to a first fluid flow path, such as an interior region of a membrane pocket, and an exterior region of the tubes may be in fluid communication with a second fluid flow path, such as an exterior region of the membrane pocket. The lumens may be fluidly connected to a first inlet of the membrane module to facilitate introduction of a first solution to a first flow path while the exterior region of the tubes may be fluidly connected to a second inlet of the membrane module to facilitate introduction of a second solution to a second fluid flow path. The lumens of another end cap may be fluidly connected to a first outlet of the membrane module to facilitate withdrawal of a first solution from a first flow path while the exterior region of the tubes may be fluidly connected to a second outlet of the membrane module to facilitate withdrawal of a second solution from a second fluid flow path. In embodiments where an end cap comprises an inlet and an outlet, the lumens may be fluidly connected to a first inlet of the membrane module to deliver a first solution to a first fluid flow path while the exterior region of the tubes may be fluidly connected to a first outlet of the membrane module to withdraw a second solution from a second fluid flow path. Various other configurations apart from these example configurations are possible.

In accordance with one or more embodiments, a membrane module may include one or more features to ensure isolation of fluid flow paths within the module but for desired transmembrane transport for separation. The end caps described above may be one such feature. Other features may be implemented alone or in conjunction with the end caps. In some embodiments, at least a portion of one or more ends of a spiral wound forward osmosis membrane may be mounted with a plate or other mechanical or structural approach capable of preventing mixing between various solutions supplied or withdrawn from the module. In other embodiments at least a portion of one or more ends of a spiral wound forward osmosis membrane may be potted to facilitate isolation of fluid flow paths. Various membrane potting techniques and materials are well-known, and generally involve use of curable resin materials. In some embodiments, potting may generally prevent a fluid entering or exiting a first fluid flow path from also entering or exiting a second fluid flow path, and vice versa. For example, potting may prevent a first fluid flowing into lumens of end cap tubes from also flowing in between the tubes. Likewise, potting may generally prevent a second fluid flowing between end cap tubes from also flowing into lumens of the end cap tubes. In some non-limiting embodiments, this may be achieved with any epoxy-like substance that is liquid and then solidifies. Some potting materials are characterized as being generally rigid while others are more flexible. Each property has associated benefits and, in some embodiments, it may be desirable to use a combination of resin materials for potting. In embodiments where an end cap and/or plate or other mechanical or structural device is used, potting may offer supplemental protection against undesirable mixing at fluid inlets and/or outlets of a spirally wound forward osmosis membrane module.

In accordance with one or more embodiments, a forward osmosis membrane module may generally be constructed and arranged to promote uniform flux through the membrane module, such as along a longitudinal axis of the module. A uniform flux may generally promote efficient use of available membrane surface area. Design considerations which may promote uniform flux include optimization of parameters such as, for example, flow rate, stream turbulence, balancing of the concentrations and volumes of the feed and draw solutions, flow channel height, patterning on the membrane surface, flow distributors or supplementary flow distributers at either end of the membrane module to ensure even flow throughout the channels at any point on the radial axis of the module, and the diameter and length of the membrane module.

In accordance with one or more embodiments, a support structure may be associated with the spirally wound membrane module. For example, a rod or shaft may support a spirally wound membrane. In some embodiments, one or more forward osmosis membranes may be wrapped around a support structure. In certain embodiments, one or more forward osmosis membrane pockets, such as a plurality, may be spiraled around a support structure. The one or more membranes may be connected to the support structure. In other embodiments, they may be unattached. In some embodiments, the module does not include a permeate tube, such as a central permeate tube, for introduction or collection of one or more fluid streams. Thus, in at least one embodiment, the support structure is not a permeate tube.

In accordance with one or more embodiments, one or more spacers may be positioned along one or more fluid flow paths. Spacers may generally facilitate promotion of uniform flux along fluid flow paths, may direct fluid flow along flow paths, and may promote any desirable turbulence within the module. One or more spacers may be positioned along a first fluid flow path and/or a second fluid flow path. In some embodiments, spacers may be positioned along a membrane pocket and/or along an exterior region of a membrane pocket. In at least some embodiments, spacers may be positioned between adjacent membranes of a membrane module. Spacers may be used to strategically adjust one or more parameters associated with a fluid flow path. For example, the dimensions, such as thickness, width or height of spacers may be selected so as to result in a desired height, volume, flux or other parameter of a fluid flow path. It may be desirable to vary one or more parameters of a fluid flow path along a longitudinal axis of a fluid flow path. In at least one embodiment, the thickness of spacers along a longitudinal axis of the membrane module may be varied to achieve a desired profile. For example, it may be desirable to taper one or more fluid flow paths along a longitudinal axis of a module.

In at least one embodiment, a spirally wound forward osmosis membrane module does not include glue lines or is substantially free of glue lines. Use of glue lines is commonly known to generally facilitate direction of fluid flow within a membrane module. In some embodiments, a forward osmosis membrane, such as one folded or otherwise constructed and arranged to form a compartment or pocket, does not include a glue line along a fluid flow path, such as to direct fluid flow. For example, some embodiments may not include a glue line associated with an interior region of a membrane pocket. One or more such membranes without glue lines may be spirally wound within a forward osmosis membrane module in accordance with one or more embodiments. In some embodiments, glue or adhesive may still be used along the edges of a membrane pocket so as to seal the pocket, secure end caps and/or to connect the membrane to a support structure.

A spirally wound membrane module in accordance with one or more embodiments may be used in pressure retarded osmosis. Pressure retarded osmosis may generally relate to deriving osmotic power or salinity gradient energy from a salt concentration difference between two solutions, such as a concentrated draw solution and a dilute working fluid. In some examples, seawater may be a first solution and fresh water or nearly deionized water may be a second solution. In some embodiments, one or more spirally wound forward osmosis membrane modules may be enclosed in a pressure vessel to facilitate pressure retarded osmosis. One or more design aspects of the forward osmosis membrane module, such as one or more characteristics or parameters pertaining to the membranes, end caps, spacers or flow paths, may be modified for pressure retarded osmotic use. Within pressure retarded osmosis, a draw solution may be introduced into a pressure chamber on a first side of a membrane, such as along a first fluid flow path of a spirally wound membrane module. In some embodiments, at least a portion of the draw solution may be pressurized based on an osmotic pressure difference between the draw solution and a dilute working fluid. The dilute working fluid may be introduced on a second side of the membrane, such as along a second fluid flow path of the spirally wound membrane module. The dilute working fluid may generally move across the membrane via osmosis, thus increasing the volume on the pressurized draw solution side of the membrane. As the pressure is compensated, a turbine may be spun to generate electricity. A resulting dilute draw solution may then be processed, such as separated, for reuse. In some embodiments, a lower-temperature heat source, such as industrial waste heat may be used in or facilitate a pressure retarded osmosis system or process.

In one non-limiting embodiment, a pressure retarded osmosis system incorporating one or more spirally wound membrane modules may be an osmotic heat engine, such as that described in WIPO Publication No. WO2008/060435 to McGinnis et al. which is hereby incorporated herein by reference in its entirety for all purposes. An osmotic heat engine may convert thermal energy into mechanical work using a semi-permeable membrane to convert osmotic pressure into electrical power. A concentrated ammonia-carbon dioxide draw solution may create high osmotic pressures which generate water flux through a semi-permeable membrane against a hydraulic pressure gradient. Depressurization of the increased draw solution volume in a turbine may produce electrical power. The process may be maintained in steady state operation through the separation of diluted draw solution into a re-concentrated draw solution and deionized water working fluid, both fore reuse in the osmotic heat engine.

In some embodiments, a forward osmosis module may be operated at pressures up to about 2000 psi. Some non-limiting forward osmosis embodiments may involve pressures between about 20 psi to about 50 psi. In operation, non-limiting example conditions for a forward osmosis module may include about a 5 molar draw solution with no hydraulic pressure exerted on it other than the about 20 psi to about 40 psi needed to carry out crossflow through the draw solution flow channel, which is diluted to a concentration of approximately about 1.5 molar by the transmembrane flux of water from the feed solution through the semipermeable membrane. The feed solution in this case would for example be a seawater feed (approximately about 0.5 molar) which is not pressurized hydraulically other than to about 20 psi to about 40 psi to induce its crossflow through the feed flow channel.

In some embodiments, a pressure retarded osmosis module may be operated at pressures up to about 2000 psi. Some non-limiting pressure retarded osmosis embodiments may involve pressures between about 1000 psi and about 2000 psi. In operation, non-limiting example conditions for a pressure retarded osmosis module may include a draw solution concentration of about 5 molar becoming diluted to about 3 molar, under a hydraulic pressure of approximately about 100 atm. The feed solution in this case would for example be a deionized water working fluid under only the hydraulic pressure (about 20 psi to about 40 psi) needed to induce its flow through the feed flow channel.

Figure 1:
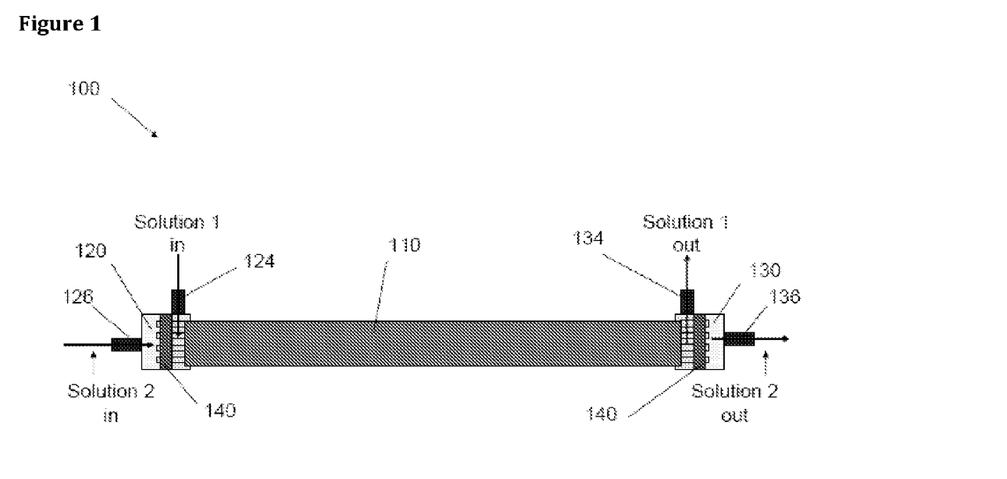
FIG. 1 presents a schematic drawing of a spiral wound forward osmosis membrane module in accordance with one or more embodiments.

FIG. 1 presents a spiral wound forward osmosis membrane module 100 in accordance with one or more non-limiting embodiments. Module 100 includes a plurality of spirally wound forward osmosis membranes 110. Each end of the module 100 includes a chamber 120, 130. Chamber 120 includes inlets 124, 126 while chamber 130 includes outlets 134, 136. Each end of the membranes 110 is potted in pots 140.

Module 100 may be sized with any desired dimensions. For example, sizing may be based on various factors including flow rate requirements and available footprint space. Modules may generally be scaled up or down to accommodate specifications of a particular application. In some non-limiting embodiments, the physical dimensions of module 100 may be between about 0.5 meters and about 2 meters in length. In one specific embodiment, module 100 may be about 1 meter in length. In some non-limiting embodiments, module 100 may be between about 1 inch and about 50 inches in diameter. In some specific embodiments, module 100 may be about 2, about 4, about 8 or about 16 inches in diameter.

Figure 2:
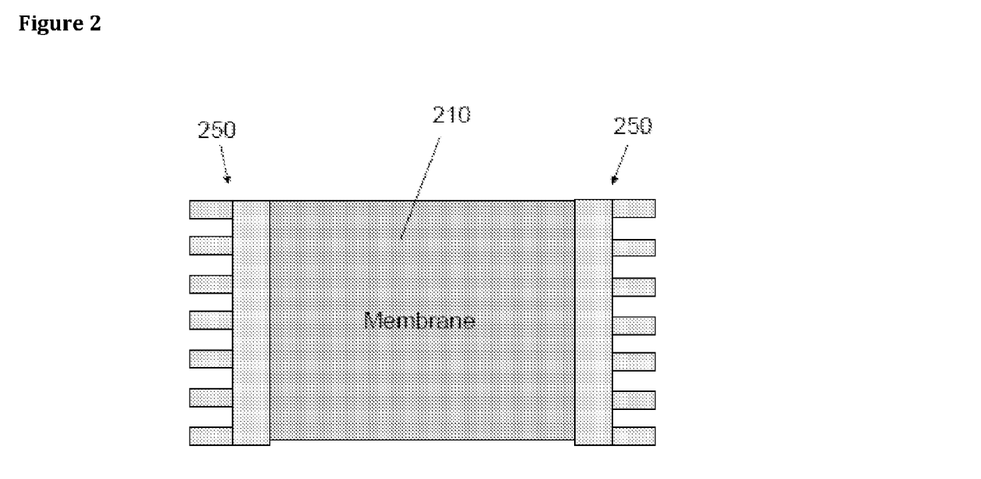
FIG. 2 presents a schematic drawing of a spiral wound forward osmosis membrane module component with end caps in accordance with one or more embodiments.
Figure 3:
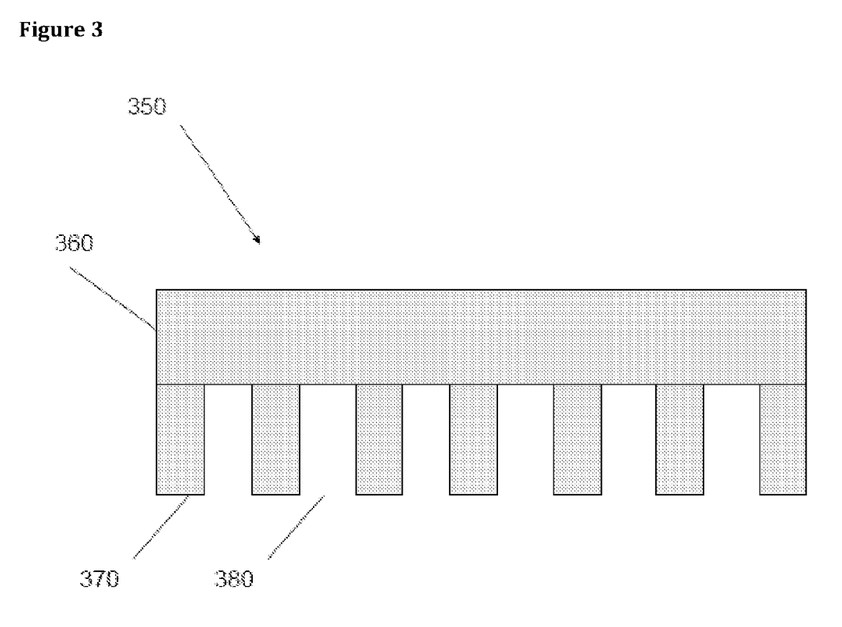
FIG. 3 presents a schematic drawing of an end cap in accordance with one or more embodiments.

FIG. 2 presents a schematic of a single forward osmosis membrane 210 unwound or prior to spiral winding. A plurality of such membranes 210 may comprise the membranes 110 of FIG. 1. An end cap 250 is positioned at each end of forward osmosis membrane 210. In some non-limiting embodiments, an end cap may be designed in accordance with end cap 350 presented in FIG. 3. End cap 350 may include a row of ports 370, separated by spaces 380 in-between. In some embodiments, ports 370 may be flat tubes. An attachment structure or manifold 360 may facilitate sealing of end cap 350 to the side of membrane 210. The dimensions of ports 370, spaces 380 and manifold 360 may be of any desired measurements and may be separately optimized.

Figure 4:
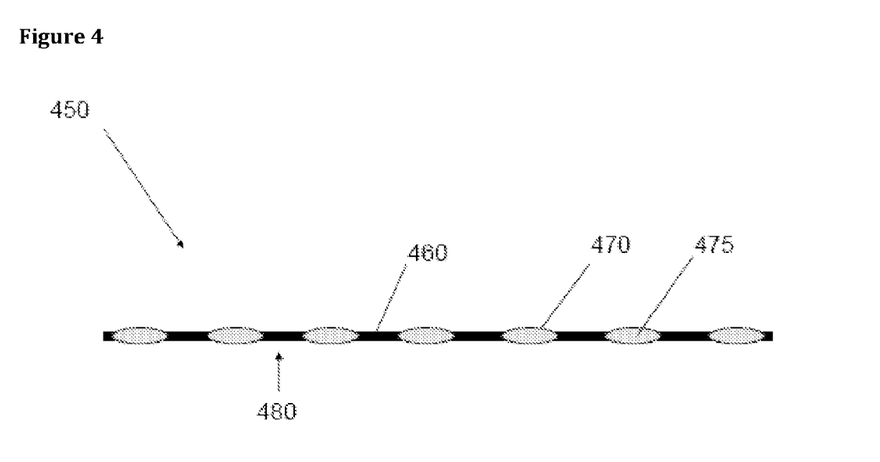
FIG. 4 presents a schematic side-view of an end cap in accordance with one or more embodiments.
Figure 5:
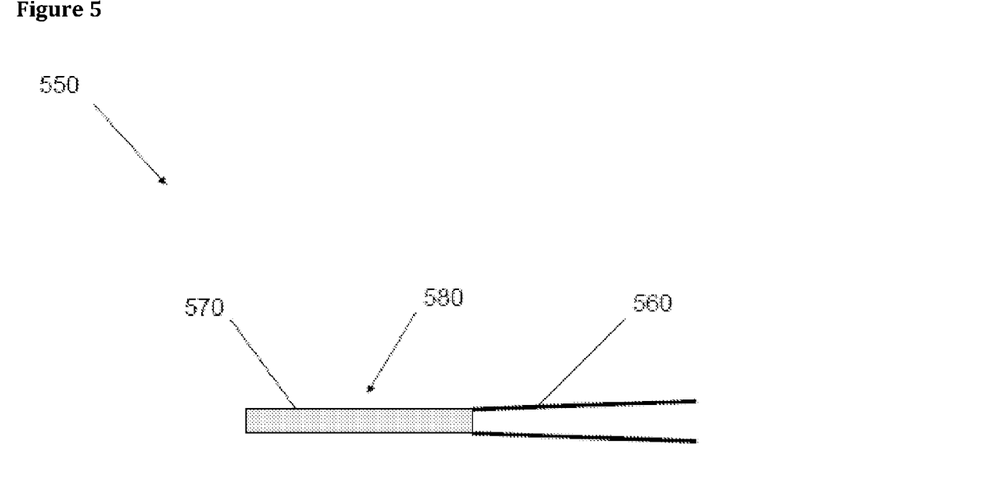
FIG. 5 presents a schematic cross-sectional view of an end cap in accordance with one or more embodiments.
Figure 6:
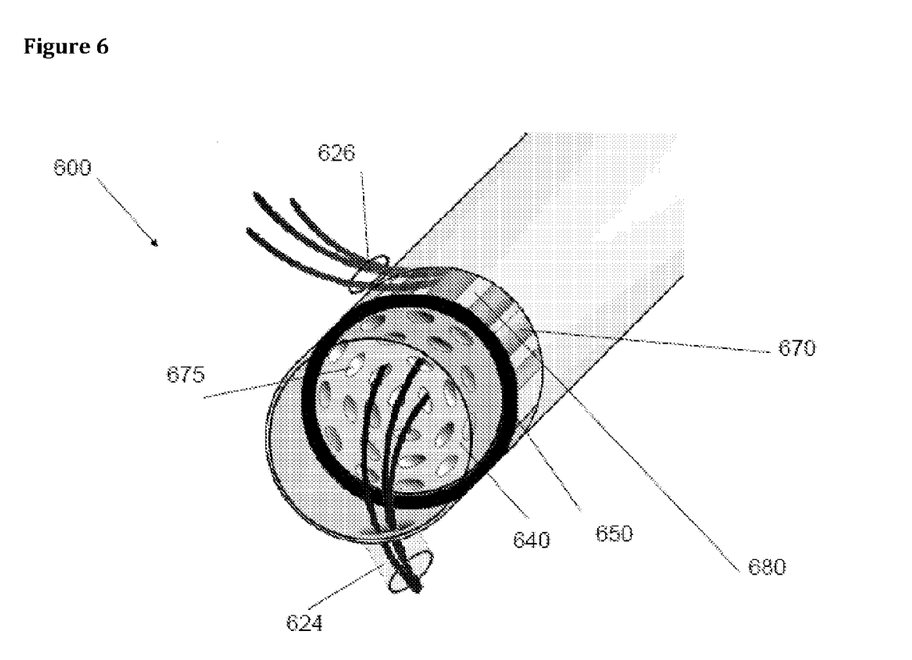
FIG. 6 presents a schematic drawing of an end portion of a spiral wound forward osmosis membrane module in accordance with one or more embodiments.
Figure 7:
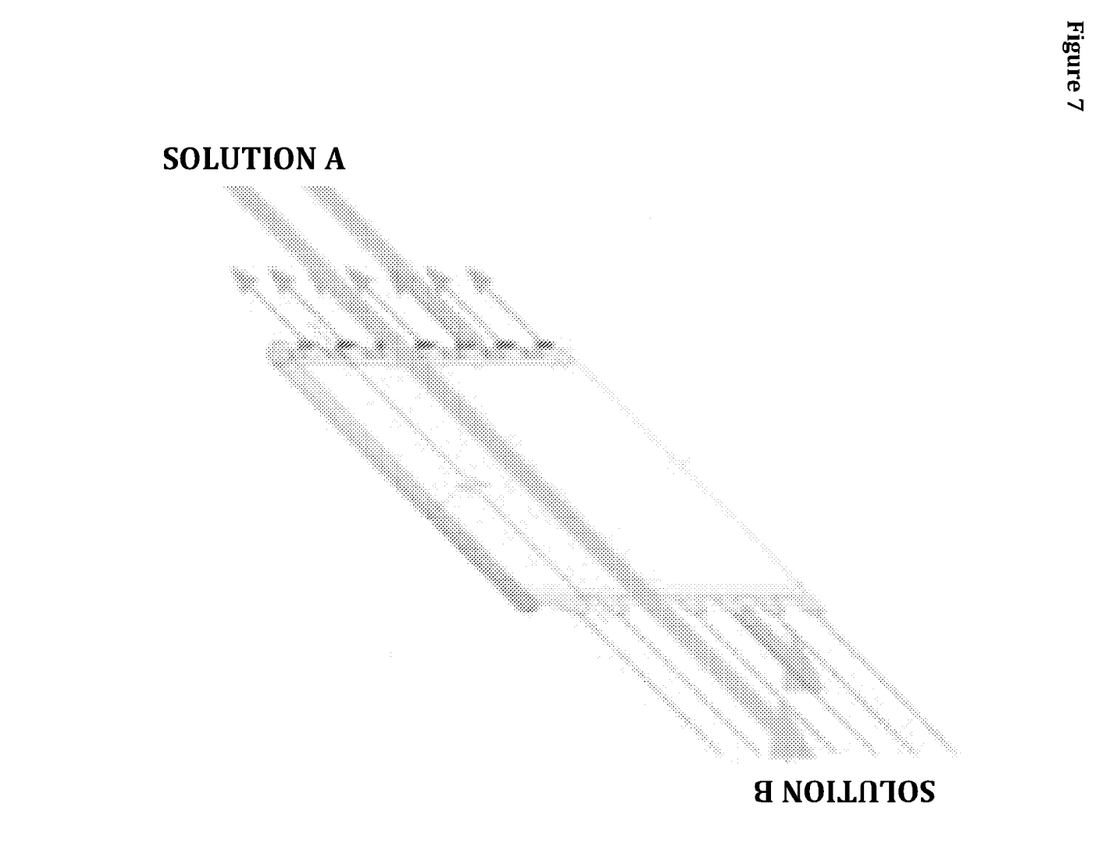
FIG. 7 presents a schematic drawing of a flow pattern through a spiral wound forward osmosis membrane module component in accordance with one or more embodiments.

A side view of an end cap 450 is presented in FIG. 4. Manifold 460 may generally facilitate attachment of end cap 450 to a membrane pocket. In operation, a first fluid may flow through the end cap 450 only through lumens 475 of the flat tubes 470. A second fluid may flow within space 480 around flat tubes 470. FIG. 5 details a cross-section of an end cap 550 in which flat tube 570 interfaces with manifold 560. Manifold 560 may be sealed to a membrane pocket. An internal portion of manifold 560 may be in fluid communication with lumens of tubes 570 and with an interior region of the membrane pocket, while an external portion of manifold 560 may be in fluid communication with space 580 around tubes 570 and with an exterior region of the membrane pocket. Thus, first and second fluid inlets may be isolated from one another to prevent mixing as illustrated in FIG. 6. FIG. 6 illustrates an end of a spiral wound forward osmosis membrane module 600. Tubes 670 of end cap 650 define lumens 675 and exterior regions 680. A first fluid may enter module 600 at first inlet 624 which is in fluid communication with lumens 675. A second fluid may enter module 600 at second inlet 626 in fluid communication with exterior regions 680. Potting 640 may facilitate fluid isolation of first and second inlets 624, 626. Fluid flow paths defined by the interior and exterior regions of the membrane pocket may also be fluidly isolated, apart from desired transmembrane transport for osmotic separation as illustrated in FIG. 7. FIG. 7 illustrates a membrane pocket with a first fluid flow path of Solution A along its exterior region and a second fluid flow path of Solution B along its interior region.

In accordance with one or more embodiments, a flat sheet membrane may be used in the production of a spiral wound forward osmosis membrane module. In some non-limiting embodiments, a flat sheet forward osmosis membrane may be folded upon itself, such as substantially in half. A first edge of a membrane sheet may be folded to a second parallel edge of the membrane sheet. In the case of an asymmetric forward osmosis membrane, the sheet may be folded such that a supporting layer of one side faces the supporting layer of the other, and the rejecting layer of each side faces out. A pocket or compartment may generally be formed out of the folded membrane. In another embodiment, active layers may face one another in the interior region of the membrane pocket. Other arrangements of backing and active layers are also possible. A naturally sealed edge of the compartment is formed via the folding operation. An edge opposite and parallel to the naturally sealed edge may be sealed by any commonly known technique including use of glue, epoxy, adhesive or friction. The two ends of the folded membrane may also be substantially sealed, as described below, while providing fluidly isolated inlets and outlets. In other embodiments, two or more membrane sheets may be attached to form a membrane compartment, rather than folding a single sheet.

In accordance with one or more embodiments, an end cap may be placed on each of the two end edges of the folded membrane sheet (the edges which are normally at either end of a spiral wound housing) in order to achieve separate flow of feed and draw solutions through the module. The lengthwise sides of the end cap may generally be sealed. The lengthwise side which will be in the center of the spiral bundle upon rolling may be optionally affixed to a bar or other internal structural support for the winding of the sheet. Any known technique may be used to sealingly attach an end cap to each of the end edges of the folded forward osmosis membrane sheet. One or more turbulence spacers may be included in the interior of the membrane pocket.

The resulting modified folded forward osmosis membrane sheet, including end caps, may be wound into a spiral. At this point, the wound membrane may have the flat tubes from the end caps protruding from either end of the wound membrane bundle. These ends may then be potted. In some embodiments, each end may be dipped in an epoxy or other form of sealant. In one non-limiting embodiment, approximately half of the length of the tubes may be sealed in this manner. The ends of the epoxy sealings may then be cut after potting to allow fluid flow into the lumens of the tubes. In some non-limiting embodiments, approximately a quarter of the length of the tubes may remain sealed.

Each end of the membrane bundle may then be mounted or sealed inside an exterior housing. During operation, feed solution such as brine or seawater may be directed into the space in-between the epoxy block and the main sheet winding, flowing around the ports into the housing and along the seawater side of the membrane. Likewise, draw solution may be directed into the open ends of the ports, flowing into the membrane housing and along the draw solution side of the membrane. This configuration may allow for similar fluid dynamics on both sides of the osmotic membrane.

A system, such as a desalination or other treatment system, may include a plurality of spirally wound forward osmosis membrane modules. A plurality of spirally wound forward osmosis membrane modules may be arranged in an array. A system may include a plurality of inlets and outlets. A source of first and second solutions may be fluidly connected to the membrane module(s) such as a source of a feed solution and a source of a draw solution. In some embodiments, a separation system, such as a distillation system, may be fluidly connected to an outlet of the membrane module. The separation system may treat a dilute draw solution produced by the forward osmosis process to produce potable water or other product stream as well as to recover the draw solution. The draw solution may then be recycled back to an inlet of the forward osmosis membrane module(s) while the product water may be delivered to a point of use. Distillation columns, such as those described in WIPO Publication No. WO 2007/146094 to McGinnis et al. which is hereby incorporated herein by reference in its entirety for all purposes, may be implemented in accordance with various embodiments.

In accordance with one or more embodiments, devices, systems and methods may generally involve a controller for adjusting or regulating at least one operating parameter of the device or a component of the system, such as, but not limited to, actuating valves and pumps, as well as adjusting a property or characteristic of one or more fluid flow streams through the spirally wound forward osmosis membrane module. A controller may be in electronic communication with at least one sensor configured to detect at least one operational parameter of the system, such as a concentration, flow rate, pH level or temperature. The controller may be generally configured to generate a control signal to adjust one or more operational parameters in response to a signal generated by a sensor. For example, the controller can be configured to receive a representation of a condition, property, or state of any stream, component or subsystem of a forward osmosis separation device. The controller typically includes an algorithm that facilitates generation of at least one output signal which is typically based on one or more of any of the representation and a target or desired value such as a set point. In accordance with one or more particular aspects, the controller can be configured to receive a representation of any measured property of any stream, and generate a control, drive or output signal to any of the system components, to reduce any deviation of the measured property from a target value.

Having now described some illustrative embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

It is to be appreciated that embodiments of the devices, systems and methods discussed herein are not limited in application to the details of construction and the arrangement of components set forth in the following description or illustrated in the accompanying drawings. The devices, systems and methods are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims. Further, acts, elements, and features discussed only in connection with one embodiment are not intended to be excluded from a similar role in other embodiments.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A spiral wound forward osmosis membrane module, comprising:
    a spirally wound forward osmosis membrane having a first closed side and an opposite second closed side defining a membrane pocket having an interior region, an exterior region, a first open end, and a second open end;
    a first end cap sealingly coupled to the first open end and comprising at least one first inlet and a manifold having an interior portion in fluid communication with the at least one first inlet and the interior region of the membrane pocket and an exterior portion defining at least one second inlet in fluid communication with the exterior region of the membrane pocket; and
    a second end cap sealingly coupled to the second open end and comprising at least one first outlet and a manifold having an interior portion in fluid communication with the at least one first outlet and the interior region of the membrane pocket and an exterior portion defining at least one second outlet in fluid communication with the exterior region of the membrane pocket, wherein each of the at least one first inlet and the at least one first outlet comprises a plurality of flat tubes having lumens fluidly connected to the interior region of the membrane pocket.

2. The module of claim 1, wherein the at least one first inlet is fluidly isolated from the at least one second inlet.

3. The module of claim 2, wherein the at least one first outlet is fluidly isolated from the at least one second outlet.

4. The module of claim 1, wherein at least a portion of one of the first and second end caps of the spirally wound forward osmosis membrane is potted.

5. The module of claim 1, further comprising at least one spacer positioned along a fluid flow path defined by the interior region of the membrane pocket from the at least one first inlet to the at least one first outlet.

6. The module of claim 1, further comprising at least one spacer positioned along a fluid flow path defined by the exterior region of the membrane pocket from the at least one second inlet to the at least one second outlet.

7. The module of claim 5 or 6, wherein a thickness of the at least one spacer varies along a longitudinal axis of the membrane module.

8. The module of claim 1, further comprising a center support in mechanical cooperation with the spirally wound forward osmosis membrane.

9. The module of claim 1, wherein the spirally wound forward osmosis membrane is asymmetric.

10. The module of claim 9, wherein the exterior region of the membrane pocket is defined by a rejecting layer of the spirally wound forward osmosis membrane.

11. The module of claim 1, wherein the module is integrated in a pressure retarded osmosis system.

12. A water treatment system, comprising:
    a spiral wound forward osmosis membrane module, comprising:
        a spirally wound forward osmosis membrane having a first closed side and an opposite second closed side defining a membrane pocket having an interior region, an exterior region, a first open end, and a second open end;
        a first end cap coupled to the first open end and comprising at least one first inlet in fluid communication with the interior region of the membrane pocket and at least one second inlet in fluid communication with the exterior region of the membrane pocket; and
        a second end cap coupled to the second open end and comprising at least one first outlet in fluid communication with the interior region of the membrane pocket and at least one second outlet in fluid communication with the exterior region of the membrane pocket, wherein the membrane module is constructed and arranged to define isolated and substantially parallel first and second fluid flow paths between the first end cap and the second end cap along a longitudinal axis of the module and the at least one first inlet and the at least one first outlet are fluidly connected to the first fluid flow path; and the at least one second inlet and the at least one second outlet are fluidly connected to the second fluid flow path, wherein each of the at least one first inlet and the at least one first outlet comprises a plurality of flat tubes having lumens fluidly connected to the interior region of the membrane pocket.

13. A method of facilitating a water treatment process, comprising:
    providing a spiral wound forward osmosis membrane module, the module comprising:
        a spirally wound forward osmosis membrane having a first closed side and an opposite second closed side defining a membrane pocket having an interior region, an exterior region, a first open end, and a second open end;
        a first end cap sealingly coupled to the first open end and comprising at least one first inlet and a manifold having an interior portion in fluid communication with the at least one first inlet and the interior region of the membrane pocket and an exterior portion defining at least one second inlet in fluid communication with the exterior region of the membrane pocket; and
        a second end cap sealingly coupled to the second open end and comprising at least one first outlet and a manifold having an interior portion in fluid communication with the at least one first outlet and the interior region of the membrane pocket and an exterior portion defining at least one second outlet in fluid communication with the exterior region of the membrane pocket, wherein each of the at least one first inlet and the at least one first outlet comprises a plurality of flat tubes having lumens fluidly connected to the interior region of the membrane pocket;
    fluidly connecting a source of a draw solution to the at least one first inlet; and
    fluidly connecting a source of an aqueous solution to be treated to the at least one second inlet.

14. The module of claim 9, wherein the interior region of the membrane pocket is defined by a rejecting layer of the spirally wound forward osmosis membrane.

15. The module of claim 1, wherein at least one of the first end cap and the second end cap is coupled to the membrane via an adhesive.

16. The module of claim 1, further comprising:
    a housing configured for receiving the spiral wound forward osmosis membrane module;
    a distributor chamber disposed at one end of the housing and comprising a first inlet in fluid communication with the at least one inlet of the first end cap and a second inlet in fluid communication with the at least one second inlet of the first end cap; and a collector chamber disposed at a second end of the housing and comprising a first outlet in fluid communication with the at least one first outlet of the second end cap and a second outlet in fluid communication with the at least one second outlet of the second end cap.

17. The module of claim 1, further comprising:

a second spirally wound forward osmosis membrane having a first closed side and an opposite second closed side defining a second membrane pocket having an interior region, an exterior region, a first open end, and a second open end;

a first end cap sealingly coupled to the first open end of the second spirally wound forward osmosis membrane and comprising at least one first inlet and a manifold having an interior portion in fluid communication with the at least one first inlet and the interior region of the second membrane pocket and an exterior portion defining at least one second inlet in fluid communication with the exterior region of the second membrane pocket; and a second end cap sealingly coupled to the second open end of the second spirally wound forward osmosis membrane and comprising at least one first outlet and a manifold having an interior portion in fluid communication with the at least one first outlet and the interior region of the second membrane pocket and an exterior portion defining at least one second outlet in fluid communication with the exterior region of the second membrane pocket, wherein each of the at least one first inlet and the at least one first outlet comprises a plurality of flat tubes having lumens fluidly connected to the interior region of the membrane pocket of the second spirally wound forward osmosis membrane.

18. The module of claim 17, further comprising:

a housing configured for receiving the spiral wound forward osmosis membrane module;

a distributor chamber disposed at one end of the housing and comprising a first inlet in fluid communication with the at least one first inlets of the first end caps and a second inlet in fluid communication with the at least one second inlets of the first end caps; and a collector chamber disposed at a second end of the housing and comprising a first outlet in fluid communication with the at least one first outlets of the second end caps and a second outlet in fluid communication with the at least one second outlets of the second end caps.

19. A spiral wound forward osmosis membrane module, comprising:

a spirally wound forward osmosis membrane having a first closed side and an opposite second closed side defining a membrane pocket having an interior region, an exterior region, a first open end, and a second open end;

a first end cap sealingly coupled to the first open end and comprising at least one first inlet and a manifold having an interior portion in fluid communication with the at least one first inlet and the interior region of the membrane pocket and an exterior portion defining at least one first outlet in fluid communication with the exterior region of the membrane pocket; and a second end cap sealingly coupled to the second open end and comprising at least one second outlet and a manifold having an interior portion in fluid communication with the at least one second outlet and the interior region of the membrane pocket and an exterior portion defining at least one second inlet in fluid communication with the exterior region of the membrane pocket, wherein each of the at least one first inlet and the at least one second outlet comprises a plurality of flat tubes having lumens fluidly connected to the interior region of the membrane pocket.

20. The module of claim 19, further comprising:

a housing configured for receiving the spiral wound forward osmosis membrane module;

a distributor chamber disposed at one end of the housing and comprising an inlet in fluid communication with the at least one inlet of the first end cap and an outlet in fluid communication with the at least one first outlet of the first end cap; and a collector chamber disposed at a second end of the housing and comprising an inlet in fluid communication with the at least one second inlet of the second end cap and an outlet in fluid communication with the at least one second outlet of the second end cap.

* * * * *